United States Patent
Ramchandran

(10) Patent No.: US 7,249,242 B2
(45) Date of Patent: Jul. 24, 2007

(54) INPUT PIPELINE REGISTERS FOR A NODE IN AN ADAPTIVE COMPUTING ENGINE

(75) Inventor: Amit Ramchandran, San Jose, CA (US)

(73) Assignee: NVIDIA Corporation, Santa Clara, CA (US)

(*) Notice: Subject to any disclaimer, the term of this patent is extended or adjusted under 35 U.S.C. 154(b) by 329 days.

(21) Appl. No.: 10/626,479

(22) Filed: Jul. 23, 2003

(65) Prior Publication Data
US 2004/0168044 A1 Aug. 26, 2004

Related U.S. Application Data

(60) Provisional application No. 60/422,063, filed on Oct. 28, 2002.

(51) Int. Cl.
G06F 9/38 (2006.01)
G06F 13/00 (2006.01)

(52) U.S. Cl. .................................................. 712/220
(58) Field of Classification Search ............... 712/220; 710/100, 307, 61, 52
See application file for complete search history.

(56) References Cited

U.S. PATENT DOCUMENTS

| | | | | |
|---|---|---|---|---|
| 4,649,512 A | * | 3/1987 | Nukiyama | 710/305 |
| 4,713,755 A | | 12/1987 | Worley et al. | |
| 5,428,754 A | * | 6/1995 | Baldwin | 712/220 |
| 5,534,796 A | * | 7/1996 | Edwards | 326/93 |
| 5,694,613 A | * | 12/1997 | Suzuki | 712/231 |
| 5,704,053 A | | 12/1997 | Santhanam | |
| 5,734,808 A | * | 3/1998 | Takeda | 345/419 |
| 5,771,362 A | * | 6/1998 | Bartkowiak et al. | 710/317 |
| 5,835,753 A | * | 11/1998 | Witt | 713/600 |
| 5,838,894 A | * | 11/1998 | Horst | 714/11 |
| 6,018,783 A | * | 1/2000 | Chiang | 710/305 |
| 6,154,492 A | * | 11/2000 | Araki et al. | 375/240.16 |
| 6,601,158 B1 | | 7/2003 | Abbott et al. | |
| 6,615,333 B1 | * | 9/2003 | Hoogerbrugge et al. | 711/169 |
| 6,618,777 B1 | * | 9/2003 | Greenfield | 710/120 |
| 6,721,884 B1 | | 4/2004 | De Oliveria Kastrup Pereira et al. | |
| 6,819,140 B2 | * | 11/2004 | Yamanaka et al. | 326/93 |
| 6,823,448 B2 | * | 11/2004 | Roth et al. | 712/244 |
| 6,865,664 B2 | | 3/2005 | Budrovic et al. | |
| 6,883,084 B1 | | 4/2005 | Donohoe | |
| 6,907,598 B2 | | 6/2005 | Fraser | |
| 2001/0029515 A1 | | 10/2001 | Mirsky | |
| 2004/0093479 A1 | | 5/2004 | Ramchandran | |
| 2004/0133745 A1 | | 7/2004 | Ramchandran | |
| 2005/0166038 A1 | | 7/2005 | Wang et al. | |

* cited by examiner

*Primary Examiner*—Eric Coleman
(74) *Attorney, Agent, or Firm*—Patterson & Sheridan, LLP

(57) ABSTRACT

Input pipeline registers are provided at inputs to functional units and data paths in a adaptive computing machine. Input pipeline registers are used to hold last-accessed values and to immediately place commonly needed constant values, such as a zero or one, onto inputs and data lines. This approach can reduce the time to obtain data values and conserve power by avoiding slower and more complex memory or storage accesses. Another embodiment of the invention allows data values to be obtained earlier during pipelined execution of instructions. For example, in a three stage fetch-decode-execute type of reduced instruction set computer (RISC), a data value can be ready from a prior instruction at the decode or execute stage of a subsequent instruction.

17 Claims, 7 Drawing Sheets

INPUT PIPELINE REGISTERS FOR A NODE IN AN ADAPTIVE COMPUTING ENGINE

CLAIM OF PRIORITY

This application claims priority from U.S. Provisional Patent Application Ser. No. 60/422,063, filed Oct. 28, 2002; entitled "RECONFIGURATION NODE RXN" which is hereby incorporated by reference as if set forth in full in this application.

CROSS-REFERENCE TO RELATED APPLICATIONS

This application is related to the following co-pending U.S. patent applications that are each incorporated by reference as if set forth in full in this application:

"ADAPTABLE DATAPATH FOR A DIGITAL PROCESSING SYSTEM," Ser. No. 10/626,833, filed Jul. 23, 2003 (Our Ref. No. 021202-003710US);

"CACHE FOR INSTRUCTION SET ARCHITECTURE USING INDEXES TO ACHIEVE COMPRESSION," Ser. No. 10/628,083, filed Jul. 24, 2003 (Our Ref. No. 021202-003730US);

"ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS," Ser. No. 09/815,122, filed on Mar. 22, 2001.

BACKGROUND OF THE INVENTION

This invention is related in general to digital processing architectures and more specifically to the use of pipeline registers to facilitate improved processing performance.

A basic design for digital signal processor (DSP) 10 architecture is shown in the prior art diagram of FIG. 1A. DSP calculations require many iterations of fast multiply-accumulate and other repetitive operations. Typically, "functional units" such as multipliers, adders, accumulators, shifters, etc. are used to perform the operations. Such functional units are shown as 12, 14 and 16. The functional units obtain instructions and data, such as values, opcodes, operands, etc. (collectively referred to as "data") from main memory 20 that is typically a random access memory (RAM). The DSP system can be included within a chip that resides in a device such as a consumer electronic device, computer, etc. Note that many variations on the design of FIG. 1A are possible. For example, a single functional unit, such as a general-purpose central processing unit (CPU) can be used. Typically, more than one memory storage unit is used, such as separate storage for instructions and data.

In the basic design, the functional units are constantly transferring data to and from memory, other functional units; and other devices, sources and destinations (collectively referred to as "components"). The speed at which data can be transferred among various components in the architecture design is a primary factor in determining the speed and efficiency of the overall design.

Since accesses to main memory (or external cache or other storage) are relatively slow and require using bus interface logic, one approach to improve performance is the use of bus register file interface 40 and bus register file 42. Bus register file 42 allows data to be stored proximately, and in association with, the localized bus 32 so that accessing the main memory is not necessary for frequently-needed values.

However, this approach still places limitation on access times and system performance as explained, below, in connection with FIG. 1B.

FIG. 1B illustrates a basic pipelined instruction cycle having fetch, decode and execute stages. In FIG. 1B, pipelines 50, 60 and 70 allow concurrent execution of each stage in a manner that is known in the art. Thus, each of the fetch, decode and execute stages for different instructions or operations can be executed in a same clock cycle. This allows, e.g., the decode stage of instruction 52 to be executed at the same time as the fetch stage of instruction 62.

One drawback of this approach is that a result of an instruction is not available until the end of the execute cycle when the data is computed and stored back into a bus register. Since data is available to an instruction after the fetch stage, an instruction executing in a different pipeline may have to wait for one or more cycles before the data result of a different instruction is available. For example, FIG. 1B shows instruction 52 completing its execute stage at a time designated by line 54. However, at this time instruction 62 is past its fetch stage and so instruction 62 is delayed within the pipeline and its stages are repeated as instruction 64 so that a fetch stage is executed to obtain the data. Alternatively, the fetch stage of instruction 62 can be flushed, rescheduled, suspended, or affected in other ways, until after execution of instruction 52's execute stage. In any case, the inability of instruction 62 to have needed data at the time of its execute stage causes delays and inefficiencies in processing. The use of additional pipelines, such as pipeline 70 can compound and further complicate data accesses.

Thus, it is desirable to provide a design that improves data accesses in a digital processing architecture.

SUMMARY OF THE INVENTION

The present invention includes input pipeline registers at inputs to different functional units. Pipeline registers are used to hold last-accessed values at various inputs and onto various buses and data lines. A preferred embodiment also allows pipeline registers to immediately place commonly needed constant values, such as zero or one, onto inputs and data lines. This approach can reduce the time to obtain data values and conserve power by avoiding slower and more complex memory or storage accesses such as via an arbitrated bus.

Another embodiment of the invention allows data values to be obtained earlier during pipelined execution of instructions. For example, in a three stage fetch-decode-execute type of reduced instruction set computer (RISC), a data value can be ready from a prior instruction at the decode or execute stage of a subsequent instruction.

A specific embodiment of the invention provides a digital processor including a clock signal for determining a processor cycle, the digital processor comprising one or more functional units coupled by a bus, wherein the one or more functional units include functional unit inputs; at least one input register coupled between the bus and at least one functional unit input; and a control signal for selectively causing the at least one input register to hold a data value from the bus for one or more processor cycles.

Another embodiment of the invention provides a method for providing data in a digital processor, the method comprising including input registers at inputs to functional units, wherein the input registers are coupled to a bus for obtaining data from the bus; and including a control signal for selectively causing the input registers to hold a data value from the bus for one or more processor cycles.

Another embodiment of the invention provides an apparatus for providing a data value in a digital processor having a multi-stage execution pipeline, the apparatus comprising one or more functional units coupled by a bus, wherein the one or more functional units include functional unit inputs; at least one input register coupled between the bus and at least one functional unit input; and a data path from an input register to a given stage in the execution pipeline so that a value provided by the input register is available for use at a time of execution of the given stage.

DETAILED DESCRIPTION OF THE INVENTION

A preferred embodiment of the invention achieves a processing node in an adaptable computing engine (ACE). Details of the ACE architecture are described in the related patent applications referenced above. A summary of the ACE architecture is first presented, below, followed by specific features of the processing node including the input pipeline register aspects of the present invention.

Adaptable Computing Engine Architecture

The ACE integrated circuitry of the present invention is readily reconfigurable, in real-time, is capable of having corresponding, multiple modes of operation, and further minimizes power consumption while increasing performance, with particular suitability for low power applications.

Figure 3:
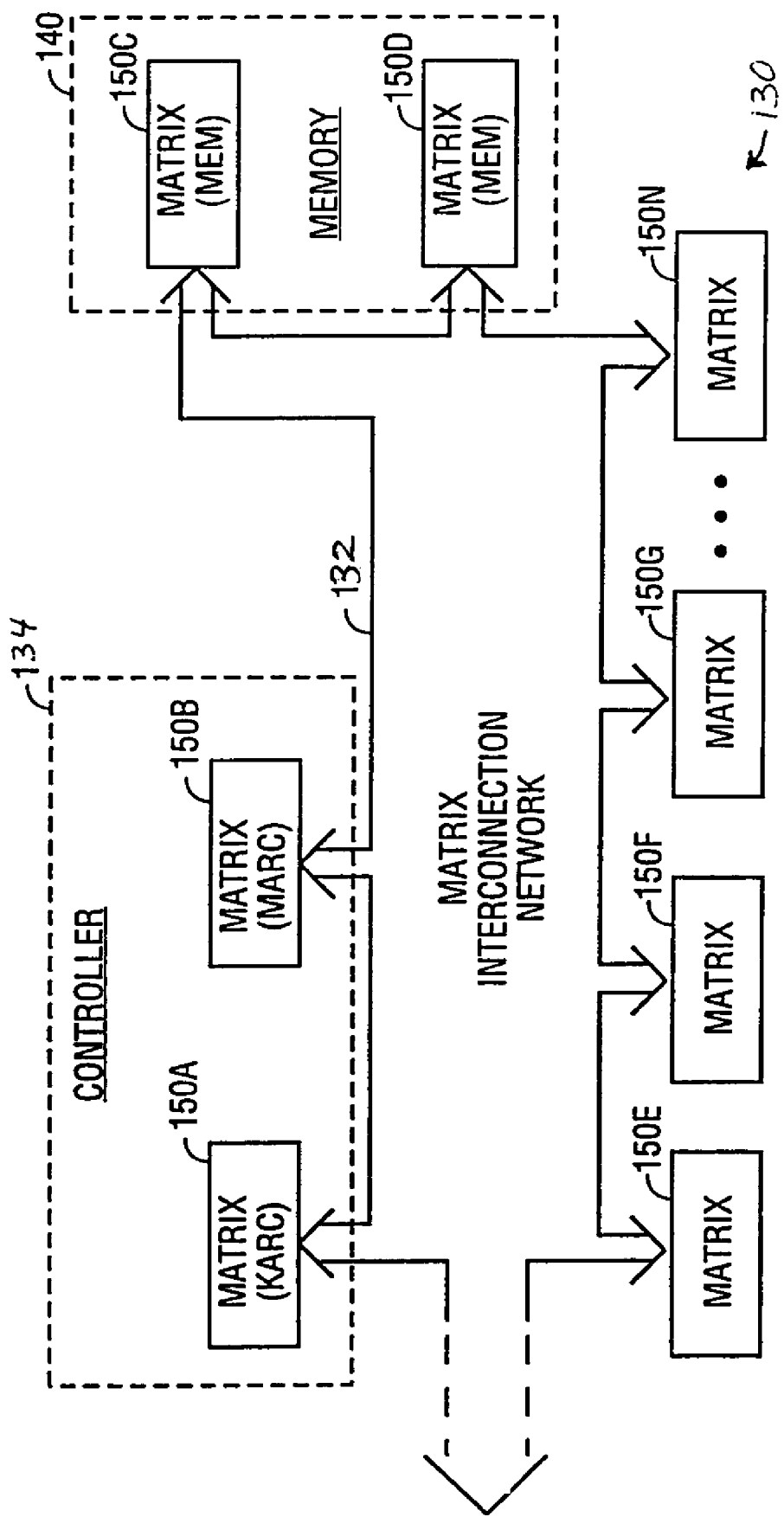
FIG. 3 is a block diagram illustrating an exemplary embodiment of the present invention.

FIG. 3 is a block diagram illustrating an exemplary apparatus 130 embodiment in accordance with the present invention. The apparatus 130, referred to herein as an adaptive computing engine ("ACE") 130, is preferably embodied as an integrated circuit, or as a portion of an integrated circuit having other, additional components. In the exemplary embodiment, and as discussed in greater detail below, the ACE 130 includes one or more reconfigurable matrices (or nodes) 150, such as matrices 150A through 150N as illustrated, and a matrix interconnection network 132. Also in the exemplary embodiment, and as discussed in detail below, one or more of the matrices 150, such as matrices 150A and 150B, are configured for functionality as a controller 134, while other matrices, such as matrices 150C and 150D, are configured for functionality as a memory 140. The various matrices 150 and matrix interconnection network 110 may also be implemented together as fractal subunits, which may be scaled from a few nodes to thousands of nodes.

The ACE 130 does not utilize traditional (and typically separate) data, DMA, random access, configuration and instruction busses for signaling and other transmission between and among the reconfigurable matrices 150, the controller 134, and the memory 140, or for other input/output ("I/O") functionality. Rather, data, control and configuration information are transmitted between and among these matrix 150 elements, utilizing the matrix interconnection network 132, which may be configured and reconfigured, in real-time, to provide any given connection between and among the reconfigurable matrices 150, including those matrices 150 configured as the controller 134 and the memory 140, as discussed in greater detail below.

The matrices 150 configured to function as memory 140 may be implemented in any desired or exemplary way, utilizing computational elements (discussed below) of fixed memory elements, and may be included within the ACE 130 or incorporated within another IC or portion of an IC. In the exemplary embodiment, the memory 140 is included within the ACE 130, and preferably is comprised of computational elements which are low power consumption random access memory (RAM), but also may be comprised of computational elements of any other form of memory, such as flash, DRAM, SRAM, MRAM, ROM, EPROM or E2PROM. In the exemplary embodiment, the memory 140 preferably includes direct memory access (DMA) engines, not separately illustrated.

The controller 134 is preferably implemented, using matrices 150A and 150B configured as adaptive finite state machines, as a reduced instruction set ("RISC") processor, controller or other device or IC capable of performing the two types of functionality discussed below. (Alternatively, these functions may be implemented utilizing a conventional RISC or other processor.) The first control functionality, referred to as "kernal" control, is illustrated as kernal controller ("KARC") of matrix 150A, and the second control functionality, referred to as "matrix" control, is illustrated as matrix controller ("MARC") of matrix 150B. The kernal and matrix control functions of the controller 134 are explained in greater detail below, with reference to the configurability and reconfigurability of the various matrices 150, and with reference to the exemplary form of combined data, configuration and control information referred to herein as a "silverware" module.

Figure 4:
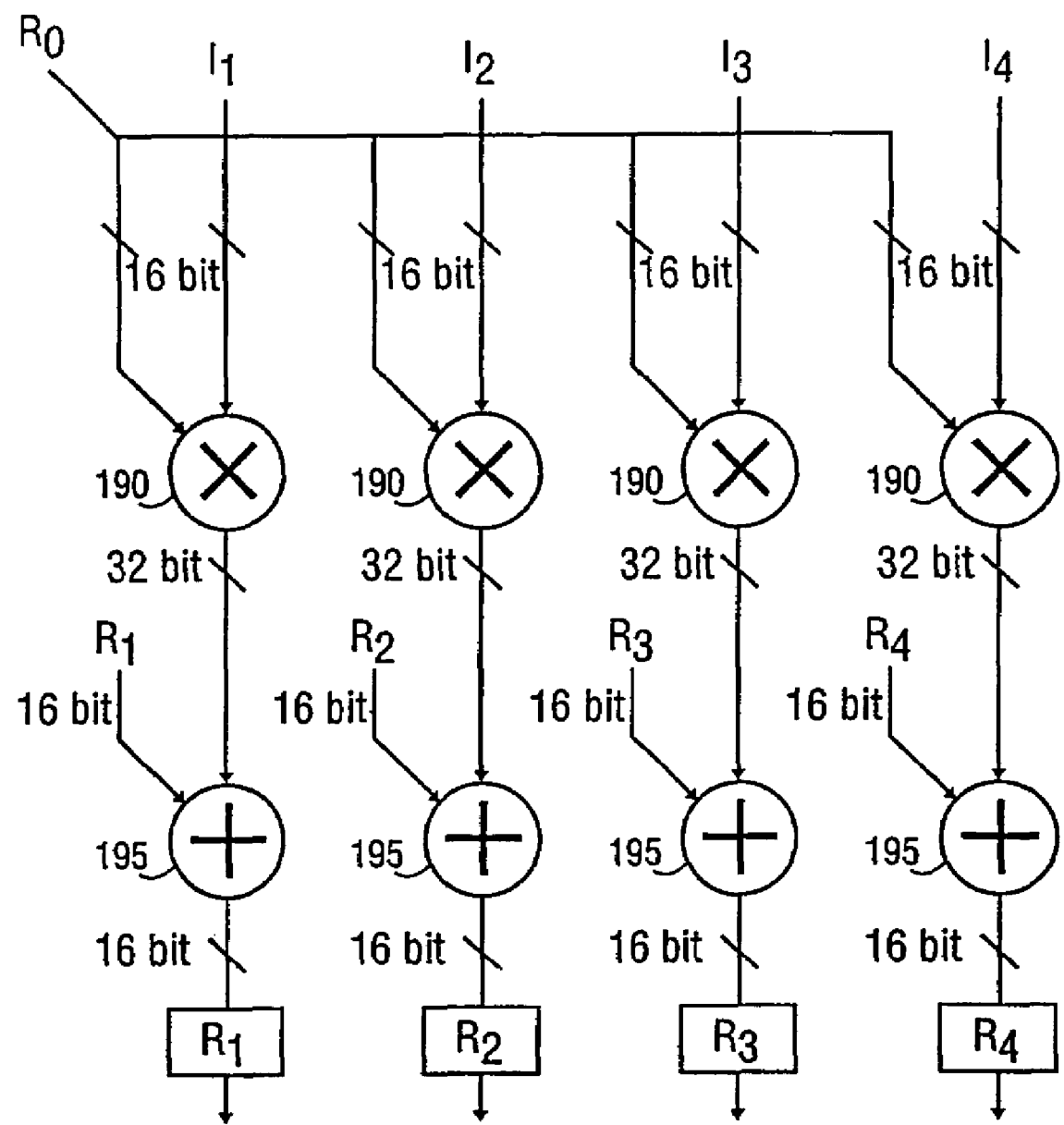
FIG. 4 is a schematic diagram illustrating an exemplary data flow graph in accordance with the present invention.

The matrix interconnection network 132 of FIG. 3, and its subset interconnection networks separately illustrated in FIGS. 3 and 4 (Boolean interconnection network 210, data interconnection network 240, and interconnect 220), collectively and generally referred to herein as "interconnect", "interconnection(s)" or "interconnection network(s)", may be implemented generally as known in the art, such as utilizing FPGA interconnection networks or switching fabrics, albeit in a considerably more varied fashion. In the exemplary embodiment, the various interconnection networks are implemented as described, for example, in U.S. Pat. No. 5,218,240, U.S. Pat. No. 5,336,950, U.S. Pat. No. 5,245,227, and U.S. Pat. No. 5,144,166, and also as discussed below and as illustrated with reference to FIGS. 7, 8 and 9. These various interconnection networks provide selectable (or switchable) connections between and among the controller 134, the memory 140, the various matrices 150, and the computational units 200 and computational elements 250 discussed below, providing the physical basis for the configuration and reconfiguration referred to herein, in response to and under the control of configuration signaling generally referred to herein as "configuration information". In addition, the various interconnection networks (110, 210, 240 and 220) provide selectable or switchable data, input, output, control and configuration paths, between and among the controller 134, the memory 140, the various matrices 150, and the computational units 200 and computational elements 250, in lieu of any form of traditional or separate input/output busses, data busses, DMA, RAM, configuration and instruction busses.

It should be pointed out, however, that while any given switching or selecting operation of or within the various interconnection networks (110, 210, 240 and 220) may be implemented as known in the art, the design and layout of the various interconnection networks (110, 210, 240 and 220), in accordance with the present invention, are new and novel, as discussed in greater detail below. For example, varying levels of interconnection are provided to correspond to the varying levels of the matrices 150, the computational units 200, and the computational elements 250, discussed below. At the matrix 150 level, in comparison with the prior art FPGA interconnect, the matrix interconnection network 132 is considerably more limited and less "rich", with lesser connection capability in a given area, to reduce capacitance and increase speed of operation. Within a particular matrix 150 or computational unit 200, however, the interconnection network (210, 220 and 240) may be considerably more dense and rich, to provide greater adaptation and reconfiguration capability within a narrow or close locality of reference.

The various matrices or nodes 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of adaptive and reconfigurable computational (or computation) units (200); the computational units 200, in turn, generally contain a different or varied mix of fixed, application specific computational elements (250), discussed in greater detail below with reference to FIGS. 3 and 4, which may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 132, also as discussed in greater detail below.

Several different, insightful and novel concepts are incorporated within the ACE 130 architecture of the present invention, and provide a useful explanatory basis for the real-time operation of the ACE 130 and its inherent advantages.

The first novel concepts of the present invention concern the adaptive and reconfigurable use of application specific, dedicated or fixed hardware units (computational elements 250), and the selection of particular functions for acceleration, to be included within these application specific, dedicated or fixed hardware units (computational elements 250) within the computational units 200 (FIG. 5) of the matrices 150, such as pluralities of multipliers, complex multipliers, and adders, each of which are designed for optimal execution of corresponding multiplication, complex multiplication, and addition functions. Given that the ACE 130 is to be optimized, in the exemplary embodiment, for low power consumption, the functions for acceleration are selected based upon power consumption. For example, for a given application such as mobile communication, corresponding C (C+ or C++) or other code may be analyzed for power consumption. Such empirical analysis may reveal, for example, that a small portion of such code, such as 10%, actually consumes 90% of the operating power when executed. In accordance with the present invention, on the basis of such power utilization, this small portion of code is selected for acceleration within certain types of the reconfigurable matrices 150, with the remaining code, for example, adapted to run within matrices 150 configured as controller 134. Additional code may also be selected for acceleration, resulting in an optimization of power consumption by the ACE 130, up to any potential trade-off resulting from design or operational complexity. In addition, as discussed with respect to FIG. 5, other functionality, such as control code, may be accelerated within matrices 150 when configured as finite state machines.

Next, algorithms or other functions selected for acceleration are converted into a form referred to as a "data flow graph" ("DFG"). A schematic diagram of an exemplary data flow graph, in accordance with the present invention, is illustrated in FIG. 4. As illustrated in FIG. 4, an algorithm or function useful for CDMA voice coding (QCELP (Qualcomm code excited linear prediction) is implemented utilizing four multipliers 190 followed by four adders 195. Through the varying levels of interconnect, the algorithms of this data flow graph are then implemented, at any given time, through the configuration and reconfiguration of fixed computational elements (250), namely, implemented within hardware which has been optimized and configured for efficiency, i.e., a "machine" is configured in real-time which is optimized to perform the particular algorithm. Continuing with the exemplary DFG or FIG. 4, four fixed or dedicated multipliers, as computational elements 250, and four fixed or dedicated adders, also as different computational elements 250, are configured in real-time through the interconnect to perform the functions or algorithms of the particular DFG.

The third and perhaps most significant concept of the present invention, and a marked departure from the concepts and precepts of the prior art, is the concept of reconfigurable "heterogeneity" utilized to implement the various selected algorithms mentioned above. As indicated above, prior art reconfigurability has relied exclusively on homogeneous FPGAs, in which identical blocks of logic gates are repeated as an array within a rich, programmable interconnect, with the interconnect subsequently configured to provide connections between and among the identical gates to implement a particular function, albeit inefficiently and often with routing and combinatorial problems. In stark contrast, in accordance with the present invention, within computation units 200, different computational elements (250) are implemented directly as correspondingly different fixed (or dedicated) application specific hardware, such as dedicated multipliers, complex multipliers, and adders. Utilizing interconnect (210 and 220), these differing, heterogeneous computational elements (250) may then be adaptively configured, in real-time, to perform the selected algorithm, such as the performance of discrete cosine transformations often utilized in mobile communications. For the data flow graph example of FIG. 4, four multipliers and four adders will be configured, i.e., connected in real-time, to perform the particular algorithm. As a consequence, in accordance with the present invention, different ("heterogeneous") computational elements (250) are configured and reconfigured, at any given time, to optimally perform a given algorithm or other function. In addition, for repetitive functions, a given instantiation or configuration of computational elements may also remain in place over time, i.e., unchanged, throughout the course of such repetitive calculations.

The temporal nature of the ACE 130 architecture should also be noted. At any given instant of time, utilizing different levels of interconnect (110, 210, 240 and 220), a particular configuration may exist within the ACE 130 which has been optimized to perform a given function or implement a particular algorithm. At another instant in time, the configuration may be changed, to interconnect other computational elements (250) or connect the same computational elements 250 differently, for the performance of another function or algorithm. Two important features arise from this temporal reconfigurability. First, as algorithms may change over time to, for example, implement a new technology standard, the ACE 130 may co-evolve and be reconfigured to implement the new algorithm. For a simplified example, a fifth multiplier and a fifth adder may be incorporated into the DFG of FIG. 4 to execute a correspondingly new algorithm, with additional interconnect also potentially utilized to implement any additional bussing functionality. Second, because computational elements are interconnected at one instant in time, as an instantiation of a given algorithm, and then reconfigured at another instant in time for performance of another, different algorithm, gate (or transistor) utilization is maximized, providing significantly better performance than the most efficient ASICs relative to their activity factors.

This temporal reconfigurability of computational elements 250, for the performance of various different algorithms, also illustrates a conceptual distinction utilized herein between configuration and reconfiguration, on the one hand, and programming or reprogrammability, on the other hand. Typical programmability utilizes a pre-existing group or set of functions, which may be called in various orders, over time, to implement a particular algorithm. In contrast, configurability and reconfigurability, as used herein, includes the additional capability of adding or creating new functions which were previously unavailable or non-existent.

Next, the present invention also utilizes a tight coupling (or interdigitation) of data and configuration (or other control) information, within one, effectively continuous stream of information. This coupling or commingling of data and configuration information, referred to as a "silverware" module, is the subject of a separate, related patent application. For purposes of the present invention, however, it is sufficient to note that this coupling of data and configuration information into one information (or bit) stream helps to enable real-time reconfigurability of the ACE 130, without a need for the (often unused) multiple, overlaying networks of hardware interconnections of the prior art. For example, as an analogy, a particular, first configuration of computational elements at a particular, first period of time, as the hardware to execute a corresponding algorithm during or after that first period of time, may be viewed or conceptualized as a hardware analog of "calling" a subroutine in software which may perform the same algorithm. As a consequence, once the configuration of the computational elements has occurred (i.e., is in place), as directed by the configuration information, the data for use in the algorithm is immediately available as part of the silverware module. The same computational elements may then be reconfigured for a second period of time, as directed by second configuration information, for execution of a second, different algorithm, also utilizing immediately available data. This has the further result of additional efficiency, as the configured computational elements may execute, in comparatively few clock cycles, an algorithm which may require orders of magnitude more clock cycles for execution if called as a subroutine in a conventional microprocessor or DSP.

This use of silverware modules, as a commingling of data and configuration information, in conjunction with the real-time reconfigurability of a plurality of heterogeneous and fixed computational elements 250 to form adaptive, different and heterogenous computation units 200 and matrices 150, enables the ACE 130 architecture to have multiple and different modes of operation. For example, when included within a hand-held device, given a corresponding silverware module, the ACE 130 may have various and different operating modes as a cellular or other mobile telephone, a music player, a pager, a personal digital assistant, and other new or existing functionalities. In addition, these operating modes may change based upon the physical location of the device; for example, when configured as a CDMA mobile telephone for use in the United States, the ACE 130 may be reconfigured as a GSM mobile telephone for use in Europe.

Referring again to FIG. 3, the functions of the controller 134 (preferably matrix (KARC) 150A and matrix (MARC) 150B, configured as finite state machines) may be explained with reference to a silverware module, namely, the tight coupling of data and configuration information within a single stream of information, with reference to multiple potential modes of operation, with reference to the reconfigurable matrices 150, and with reference to the reconfigurable computation units 200 and the computational elements 150 illustrated in FIG. 5. As indicated above, through a silverware module, the ACE 130 may be configured or reconfigured to perform a new or additional function, such as an upgrade to a new technology standard or the addition of an entirely new function, such as the addition of a music function to a mobile communication device. Such a silverware module may be stored in the matrices 150 of memory 140, or may be input from an external (wired or wireless) source through, for example, matrix interconnection network 132. In the exemplary embodiment, one of the plurality of matrices 150 is configured to decrypt such a module and verify its validity, for security purposes. Next, prior to any configuration or reconfiguration of existing ACE 130 resources, the controller 134, through the matrix (KARC) 150A, checks and verifies that the configuration or reconfiguration may occur without adversely affecting any pre-existing functionality, such as whether the addition of music functionality would adversely affect pre-existing mobile communications functionality. In the exemplary embodiment, the system requirements for such configuration or reconfiguration are included within the silverware module, for use by the matrix (KARC) 150A in performing this evaluative function. If the configuration or reconfiguration may occur without such adverse affects, the silverware module is allowed to load into the matrices 150 of memory 140, with the matrix (KARC) 150A setting up the DMA engines within the matrices 150C and 150D of the memory 140 (or other stand-alone DMA engines of a conventional memory). If the configuration or reconfiguration would or may have such adverse affects, the matrix (KARC) 150A does not allow the new module to be incorporated within the ACE 130.

Continuing to refer to FIG. 3, the matrix (MARC) 150B manages the scheduling of matrix 150 resources and the timing of any corresponding data, to synchronize any configuration or reconfiguration of the various computational elements 250 and computation units 200 with any corresponding input data and output data. In the exemplary embodiment, timing information is also included within a silverware module, to allow the matrix (MARC) 150B through the various interconnection networks to direct a reconfiguration of the various matrices 150 in time, and preferably just in time, for the reconfiguration to occur before corresponding data has appeared at any inputs of the various reconfigured computation units 200. In addition, the matrix (MARC) 150B may also perform any residual processing which has not been accelerated within any of the various matrices 150. As a consequence, the matrix (MARC) 150B may be viewed as a control unit which "calls" the configurations and reconfigurations of the matrices 150, computation units 200 and computational elements 250, in real-time, in synchronization with any corresponding data to be utilized by these various reconfigurable hardware units, and which performs any residual or other control processing. Other matrices 150 may also include this control functionality, with any given matrix 150 capable of calling and controlling a configuration and reconfiguration of other matrices 150.

Figure 5:
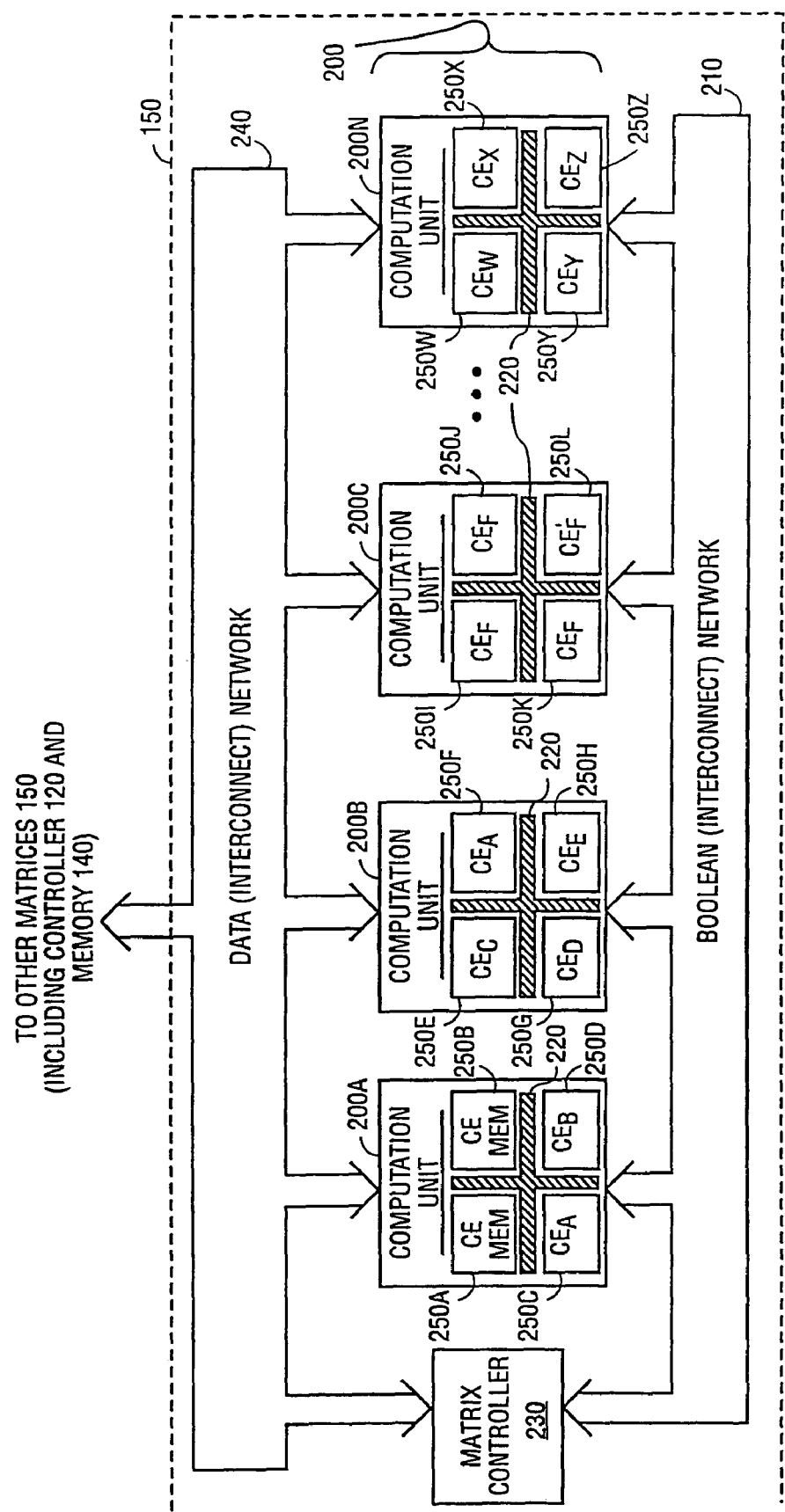
FIG. 5 is a block diagram illustrating a reconfigurable matrix, a plurality of computation units, and a plurality of computational elements, in accordance with the present invention.

FIG. 5 is a block diagram illustrating, in greater detail, a reconfigurable matrix 150 with a plurality of computation units 200 (illustrated as computation units 200A through 200N), and a plurality of computational elements 250 (illustrated as computational elements 250A through 250Z), and provides additional illustration of the exemplary types of computational elements 250 and a useful summary of the present invention. As illustrated in FIG. 5, any matrix 150 generally includes a matrix controller 230, a plurality of computation (or computational) units 200, and as logical or conceptual subsets or portions of the matrix interconnect network 132, a data interconnect network 240 and a Boolean interconnect network 210. As mentioned above, in the exemplary embodiment, at increasing "depths" within the ACE 130 architecture, the interconnect networks become increasingly rich, for greater levels of adaptability and reconfiguration. The Boolean interconnect network 210, also as mentioned above, provides the reconfiguration and data interconnection capability between and among the various computation units 200, and is preferably small (i.e., only a few bits wide), while the data interconnect network 240 provides the reconfiguration and data interconnection capability for data input and output between and among the various computation units 200, and is preferably comparatively large (i.e., many bits wide). It should be noted, however, that while conceptually divided into reconfiguration and data capabilities, any given physical portion of the matrix interconnection network 132, at any given time, may be operating as either the Boolean interconnect network 210, the data interconnect network 240, the lowest level interconnect 220 (between and among the various computational elements 250), or other input, output, or connection functionality.

Continuing to refer to FIG. 5, included within a computation unit 200 are a plurality of computational elements 250, illustrated as computational elements 250A through 250Z (individually and collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be reconfigurably connected together into adaptive and varied computational units 200, which also may be further reconfigured and interconnected, to execute an algorithm or other function, at any given time, such as the quadruple multiplications and additions of the DFG of FIG. 4, utilizing the interconnect 220, the Boolean network 210, and the matrix interconnection network 132.

In the exemplary embodiment, the various computational elements 250 are designed and grouped together, into the various adaptive and reconfigurable computation units 200. In addition to computational elements 250 which are designed to execute a particular algorithm or function, such as multiplication or addition, other types of computational elements 250 are also utilized in the exemplary embodiment. As illustrated in FIG. 5, computational elements 250A and 250B implement memory, to provide local memory elements for any given calculation or processing function (compared to the more "remote" memory 140). In addition, computational elements 250I, 250J, 250K and 250L are configured to implement finite state machines, to provide local processing capability (compared to the more "remote" matrix (MARC) 150B), especially suitable for complicated control processing.

With the various types of different computational elements 250 which may be available, depending upon the desired functionality of the ACE 130, the computation units 200 may be loosely categorized. A first category of computation units 200 includes computational elements 250 performing linear operations, such as multiplication, addition, finite impulse response filtering, and so on. A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 5, particularly useful for complicated control sequences, dynamic scheduling, and input/output management, while a fourth type may implement memory and memory management, such as computation unit 200A as illustrated in FIG. 3. Lastly, a fifth type of computation unit 200 may be included to perform bit-level manipulation, such as for encryption, decryption, channel coding, Viterbi decoding, and packet and protocol processing (such as Internet Protocol processing).

In the exemplary embodiment, in addition to control from other matrices or nodes 150, a matrix controller 230 may also be included within any given matrix 150, also to provide greater locality of reference and control of any reconfiguration processes and any corresponding data manipulations. For example, once a reconfiguration of computational elements 250 has occurred within any given computation unit 200, the matrix controller 230 may direct that that particular instantiation (or configuration) remain intact for a certain period of time to, for example, continue repetitive data processing for a given application. Next, a specific type of computational unit, or node, having advantageous processing architecture features is described.

Node Architecture Including Input Pipeline Registers

Figure 2B:
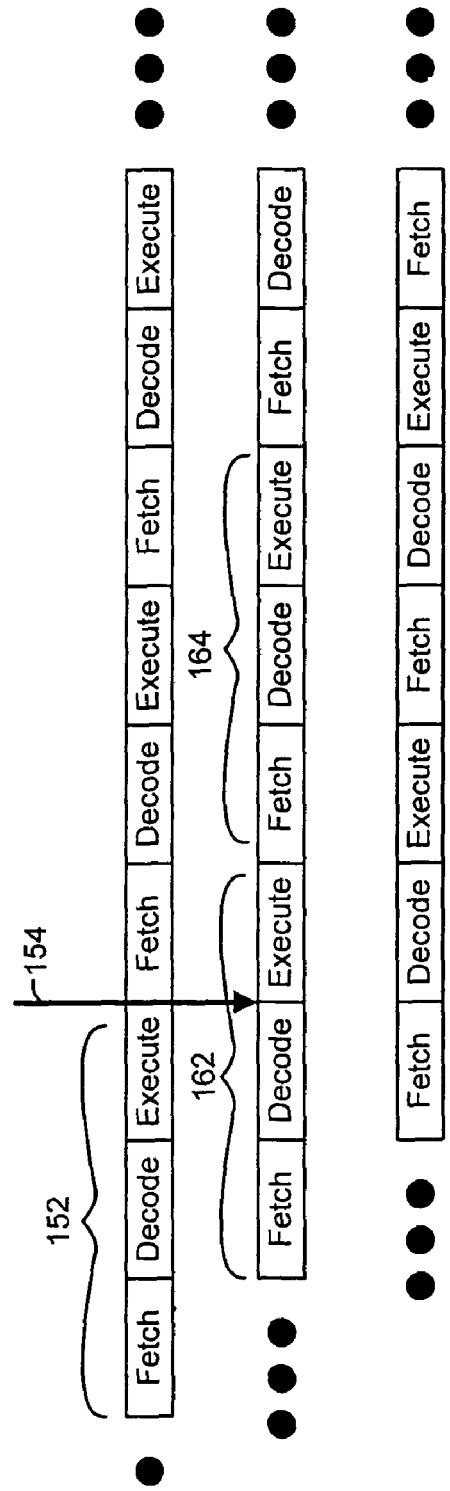
FIG. 2B shows advantages of pipelined execution according to the present invention.
Figures 1, 2A:
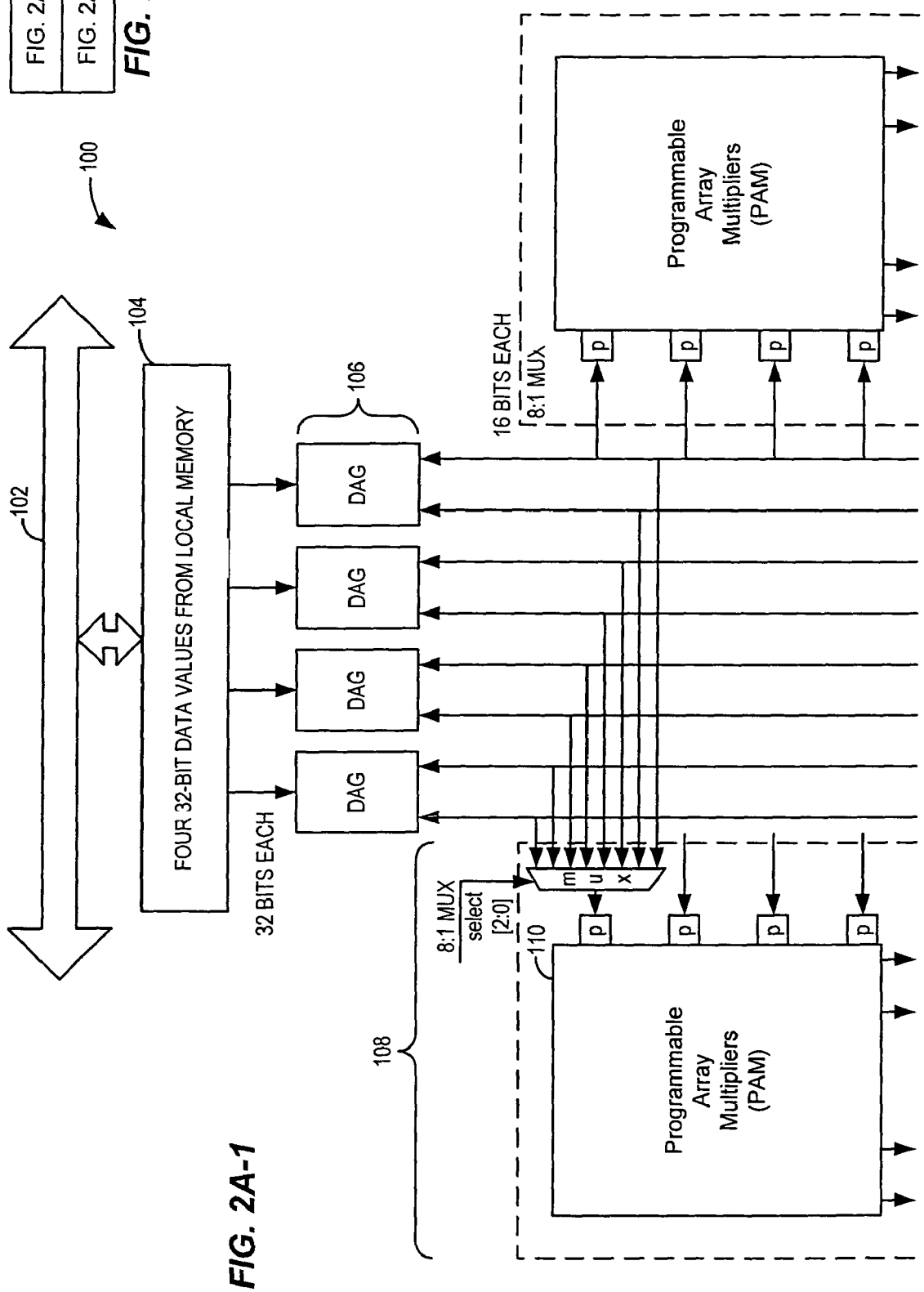
FIG. 2A illustrates a digital signal processor design of a preferred embodiment of the invention.
Figures 2, 2A:
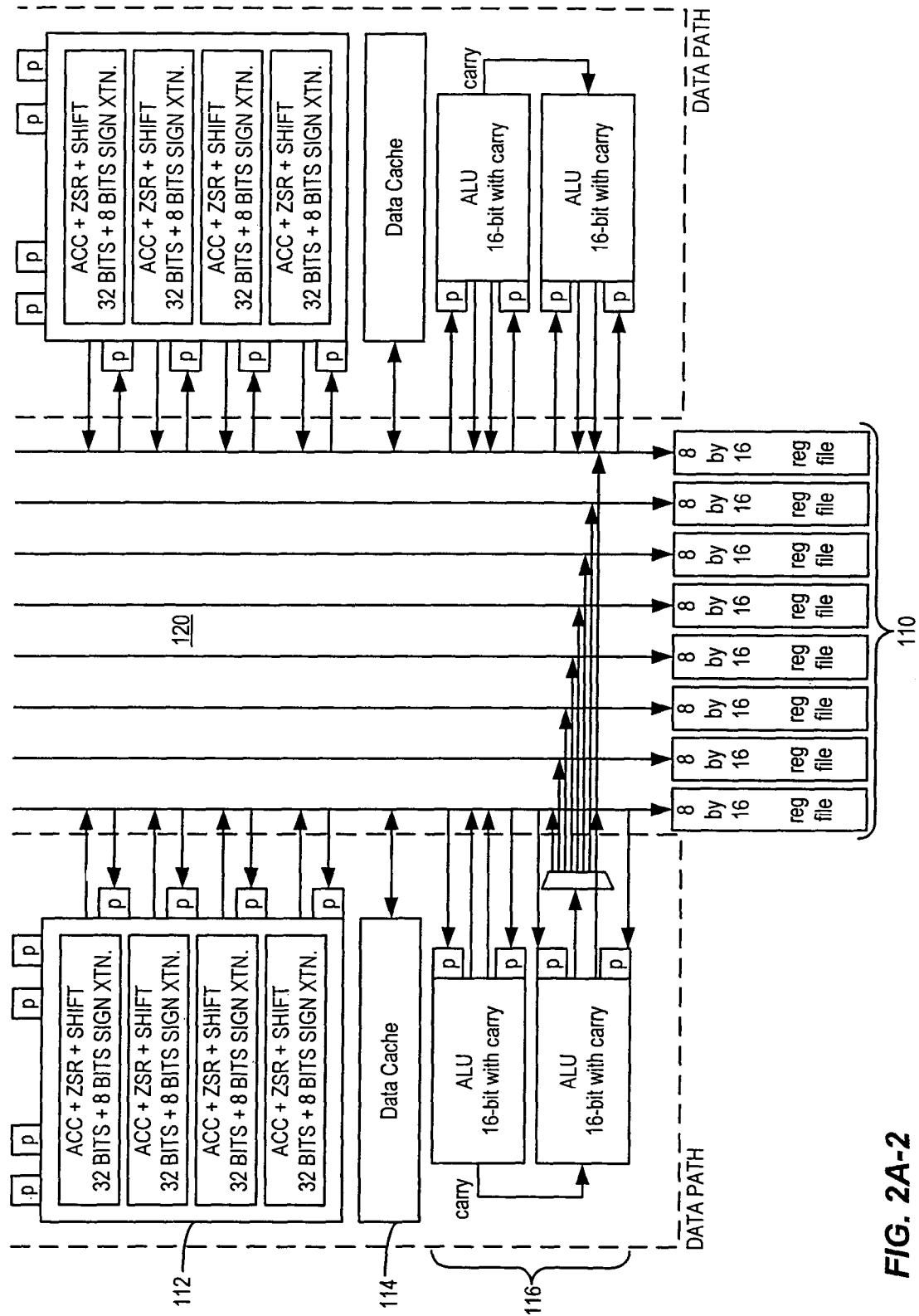

FIG. 2A shows a preferred embodiment digital processor architecture for a node according to the present invention.

In FIG. 2A, system 100 is a digital signal processor having bus 102 to a main memory (not shown) that interfaces to other components through bus interface 104. Other components in the system include data address generators (DAG) at 106, programmable array multipliers (PAMs) 110, accumulators and shift registers at 112, data cache 114, arithmetic logic units 116, system local bus 120 and bus register files 110. Additional details of the system of FIG. 2A can be found in the related patent applications referenced, above. In the preferred embodiment, several of the components referenced with numbers are duplicated on the right side of the Figure. These duplicated components are identical in operation to the referenced components and, thus, are not further described in this specification.

Input Pipeline registers are shown at various inputs and are indicated by a letter "P" in a box. For example, input pipeline registers are present at the inputs of PAM 110, accumulators and shift registers 112 and ALUs 116. Although the preferred embodiment of FIG. 2A uses input pipeline registers at the inputs of functional devices, other embodiments can use input pipeline registers at different locations and on different components, such as at outputs, on buses or data lines, ports, etc. Input pipeline registers can selectively store, or "hold," a last-seen value at a corresponding input. By instructing an input pipeline register to hold a value, the value can be easily obtained for subsequent operations or for other purposes.

The input pipeline registers are also capable of being "cleared" or set to 0. This provides an efficient way to provide zero values to the functional units whereas, in some prior art approaches, a zero value must be obtained by clearing an accumulator, register, memory location or other storage, or by performing a mathematical operation or other function. Note that other approaches can allow selective setting of input pipeline registers to any arbitrary value or values, such as a "one" constant value.

The use of input pipeline registers according to the present invention allows selectively precludes the need for values to be obtained from memory, register files, or other general purpose storage. For example, values output from the PAM can be held at the input pipeline registers of the ALU.

The preferred embodiment allows control of pairs of input pipeline registers with seven control bits in an instruction word. Other embodiments can use any number, arrangement or configuration of bits or other control signals to control or configure one or more registers. In the preferred embodiment, the most-significant bit (MSB) of the 7-bit field determines whether one, or both, input pipeline registers in a pair are loaded. If the MSB is set to 1 then both registers are loaded and the remaining six bits are used to denote the data path line from where the loaded value is obtained. Details of the datapath and other characteristics of the system are described in the related patent applications referenced, above.

If the MSB is set to 0 then only one input pipeline register is loaded. The three least-significant bits (LSBs) of the 7-bit field are used to select a bus number of the input pipeline register to be loaded. The remaining 3 bits of the field are used to encode the eight options shown in Table I, below.

TABLE I

Input pipeline register states

| I/p input pipeline register1 | I/p pipeline register2 |
|---|---|
| Load | Hold |
| Load | Clear |
| Hold | Load |
| Clear | Load |
| Hold | Hold |
| Hold | Clear |
| Clear | Hold |
| Clear | Clear |

Where 'Clear' means that the input pipeline register stored value is set to zero, 'Hold' indicates that the value of the input pipeline register does not change and 'Load' loads the input pipeline register from its associated input bus.

Accumulator input pipeline registers can also be controlled in pairs. The preferred embodiment allows each of the 8 accumulators in a bank to be paired as ACC0 and ACC1, ACC2 and ACC3, ACC4 and ACC5; and, lastly, ACC6 and ACC7. This allows cascading of the hardware for 72 bit operations. A 7-bit field is then used to direct loading of input pipeline registers corresponding to the accumulator pairs. Tables II through IV, below, show details of the sub-fields of the 7-bit pipeline control field for an accumulator pair, ACC0 and ACC1. Control of other pairs operates similarly.

TABLE II

| MSB of control field | Description |
|---|---|
| 1 | Load input pipeline register for ACC0 according to control field bits [5:3]; and load input pipeline register for ACC1 according to control field bits [2:0]. |
| 0 | Load either ACC0 or ACC1 by following encoding in Tables III and IV below. |

TABLE III

| Bits [5:3] of control field | Input pipeline register for ACC0 | Input pipeline register for ACC1 |
|---|---|---|
| 000 | Load using control bits [2:0]. Encoding shown in the Table IV, below. | Hold previous value |
| 001 | Load using control bits [2:0]. Encoding shown in Table IV, below. | Zero the register |
| 010 | Hold previous value | Load using control bits [2:0]. Encoding shown in Table IV, below. |
| 011 | Zero the register | Load using control bits [2:0]. Encoding shown in Table IV, below. |
| 100 | Hold previous value | Hold previous value |
| 101 | Hold previous value | Zero the register |
| 110 | Zero the register | Hold previous value |
| 111 | Zero the register | Zero the register |

TABLE IV

| Bits [2:0] of control field | Load using the following data path value |
|---|---|
| 000 | dp0 |
| 001 | dp1 |
| 010 | dp2 |
| 011 | dp3 |
| 100 | dp4 |
| 101 | dp5 |
| 110 | dp6 |
| 111 | dp7 |

The preferred embodiment includes four Arithmetic Logic Units (ALUs) designated ALU0, ALU1, ALU2, ALU3. Each ALU uses a 7-bit control field for an associated input pipeline register and a 3-bit field to designate operation type. In addition ALU0 and ALU1 share a 1-bit field (C0) and ALU2 and ALU3 share a 1-bit field (C1). Table V describes the function of bits C0 and C1.

TABLE V

| Bit C0/C1 | C0 | C1 |
| --- | --- | --- |
| 1 | ALU0 and ALU1 are in 32-bit cascaded mode. | ALU2 and ALU3 are in 32-bit cascaded mode. |
| 0 | ALU0 and ALU1 are independent | ALU2 and ALU3 are independent |

ALU operations have the format shown in Table VI, described for ALU0 and ALU1. ALU2 and ALU3 have similar operations.

TABLE VI

| MSB of control field | Description |
| --- | --- |
| 1 | Load input pipeline register for ALU0 using control bits [5:3] and load ALU1 using control bits [2:0]. |
| 0 | Load either ALU0 or ALU1 according to the encoding of control bits [5:3] as shown in Tables VII and VIII, below. |

TABLE VII

| Bits [5:3] of control field | Input pipeline register for ALU0 | Input pipeline register 2 for ALU1 |
| --- | --- | --- |
| 000 | Load using control bits [2:0] with encoding shown in Table VIII, below. | Hold previous value |
| 001 | Load using control bits [2:0] with encoding shown in Table VIII, below. | Zero the register |
| 010 | Hold previous value | Load using control bits [2:0] with encoding shown in Table VIII, below. |
| 011 | Zero the register | Load using control bits [2:0] with encoding shown in Table VIII, below. |
| 100 | Hold previous value | Hold previous value |
| 101 | Hold previous value | Zero the register |
| 110 | Zero the register | Hold previous value |
| 111 | Zero the register | Zero the register |

TABLE VIII

| Bits [2:0] of control field | Load using the following data path value |
| --- | --- |
| 000 | Dp0 |
| 001 | Dp1 |
| 010 | Dp2 |
| 011 | Dp3 |
| 100 | Dp4 |
| 101 | Dp5 |
| 110 | Dp6 |
| 111 | Dp7 |

The present invention allows more efficient pipelined execution. Rather than requiring a needed data value to be available at a fetch stage of an instruction, as illustrated, above, with respect to FIG. 1B, the present invention allows a value to be used if that value is ready at a time just before the execution stage of an instruction.

Figure 1A:
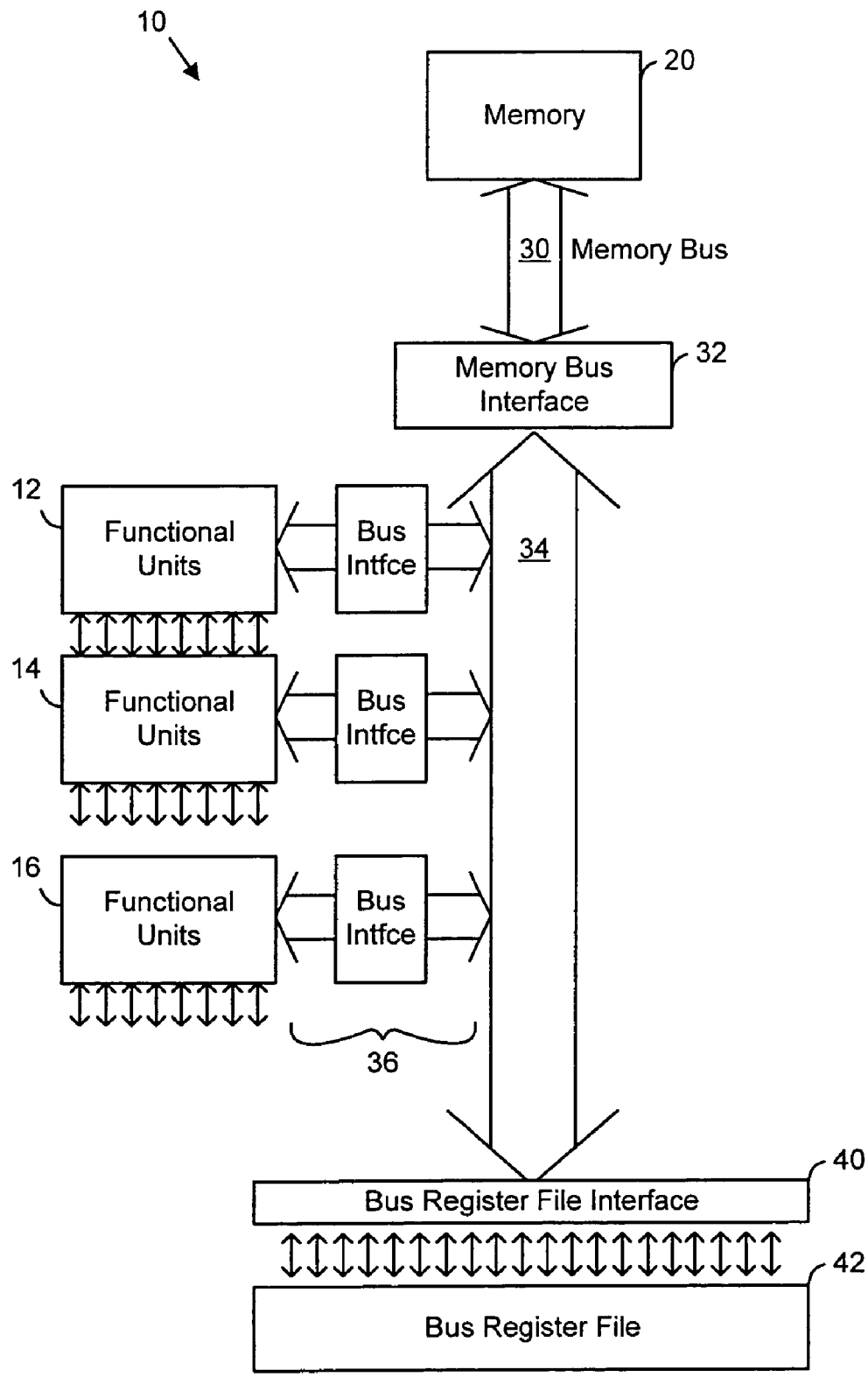
FIG. 1A illustrates a basic prior art design for digital signal processor architecture.
Figure 1B:
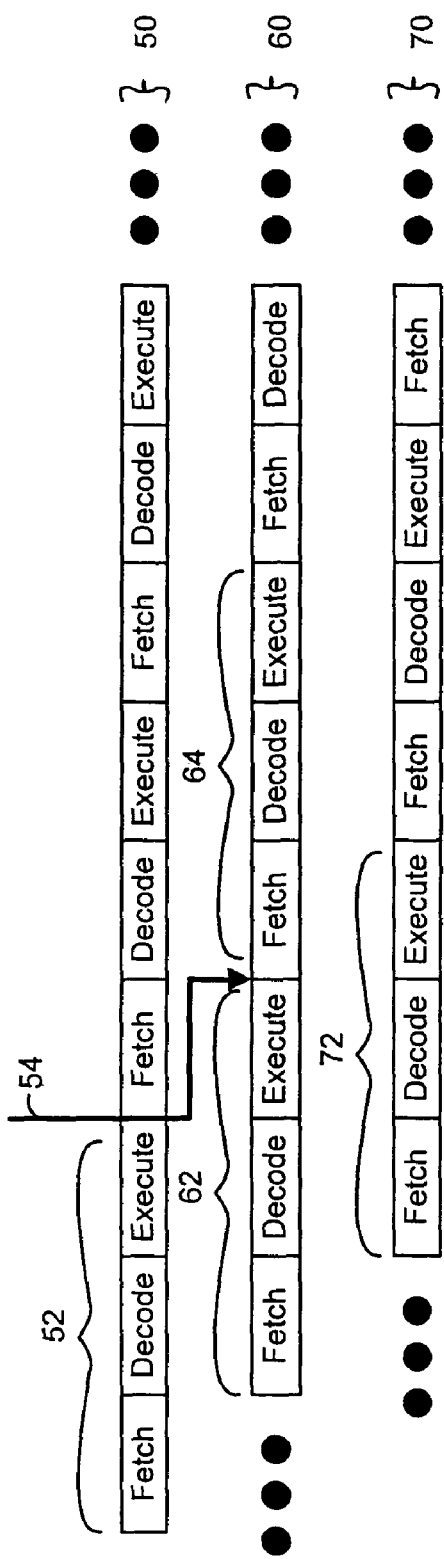
FIG. 1B shows an example of prior art pipelined execution in the basic design of FIG. 1A.

For example, FIG. 2B illustrates the same pipeline execution example of FIG. 1B. However, in FIG. 2B instruction 162 does not have to be repeated at 164 in order to utilize a value that is computed as a result of instruction 152's execution stage. Rather, the result of instruction 152's execution stage is available at time 154 by storing the value in a input pipeline register to which the pipeline execution unit that is executing the instructions has access. The present invention allows a value to be moved from a data path to a input pipeline register at the beginning or end of a clock cycle, so that a time period as long as a pipeline stage is not required to access the value. The value is available at the start of the next cycle, before the execution stage of instruction 162 commences. Thus, instruction 162 can execute without being delayed and a next instruction 164 can be executed in turn. Other advantages to pipelined execution can be realized by using features of the present invention. Pipeline execution approaches with more, or less, stages can be used.

Although the invention has been discussed with respect to specific embodiments thereof, these embodiments are merely illustrative, and not restrictive, of the invention. For example, although the term "input pipeline register" is used in this specification, it is not meant to limit the invention to use of a specific type, arrangement or configuration of storage component. A single stage pipeline, or register, can be used, or multiple stages can be used. In general, any type of storage component having more or less complexity than the input pipeline registers disclosed herein can be employed. Also, although the invention has been described with respect to a DSP architecture, any type of processing architecture can benefit from the invention. For example, although the invention has been discussed primarily with respect to a DSP RISC type architecture, any other type of digital processor can be used. For example, a single-CPU general-purpose architecture can be used. Optical, chemical, biological, asynchronous and other types of processors and processing can be suitable for use with the present invention.

Various features described herein can be used alone, or in combination with each other. For example, memory access-related functions and apparatus can be used independently of, or in combination with, the pipeline execution-related aspects of the invention.

Thus, the scope of the invention is to be determined solely by the dependent claims.

What is claimed is:

1. A computational unit in an adaptable computing engine, wherein the computational unit includes a clock signal for determining a processor cycle, the computational unit comprising
one or more functional units coupled by a bus, wherein the one or more functional units include functional unit inputs;
at least one pipeline register coupled between the bus and at the input of least one functional unit input;
a control signal for selectively causing the at least one pipeline register to hold a data value from the bus for more than one processor cycle at the input of the at least one functional unit, the data value being obtainable at the input at a start of a next processor cycle upon being needed;
a coupling of a pair of pipeline registers such that the pair of registers is responsive to a control signal value; and
control circuitry for setting the pair of pipeline registers into predetermined states based on the control signal value.

2. The computational unit of claim 1, wherein the pipeline register includes circuitry for selectively providing a constant value.

3. The computational unit of claim 1, wherein the pair of registers includes first and second registers, wherein the predetermined states include one or more of the following for the first and second registers, respectively: load, hold; load, clear; hold, load; clear, load; hold, hold; hold, clear; clear, hold; and clear, clear.

4. The computational unit of claim 1, wherein the control signal value comprises 7 bits to control loading the pairs of pipeline registers as accumulator pair enabling 72 bit operations in the computation unit.

5. The method of claim 1, wherein the data value is obtained from the at least one register without performing an access command to memory.

6. The method of claim 1 wherein a selected bit of the control signal determines whether one or both of the pipeline registers are loaded.

7. A method for providing data in a computational unit in an adaptable computing engine, the method comprising
including pipeline registers at inputs to functional units, wherein the pipeline registers are coupled to a bus for obtaining data from the bus;
including a control signal for selectively causing the pipeline registers to hold a data value from the bus for one or more processor cycles at an input of at least one functional unit in the one or more functional units, the data value being obtainable at the input at a start of a next processor cycle upon being needed;
coupling a pair of registers such that the pair of pipeline registers is responsive to a control signal value; and
providing control circuitry for setting the pair of pipeline registers into predetermined states based on the control signal value.

8. The method of claim 7, wherein the pipeline register includes circuitry for selectively providing a constant value.

9. The computational unit of claim 7, wherein the pair of registers includes first and second registers and wherein the predetermined states include one or more of the following for the first and second registers, respectively: load, hold; load, clear; hold, load; clear, load; hold, hold; hold, clear; clear, hold; and clear, clear.

10. The computational unit of claim 7, wherein the control signal value comprises 7 bits to control loading the pairs of pipeline registers as accumulator pair enabling 72 bit operations in the computation unit.

11. The method of claim 7, wherein the data value is obtained from the at least one register without performing an access command to memory.

12. An apparatus for providing a data value in a computational unit in an adaptable computing engine, wherein the computational unit includes a multi-stage execution pipeline, the apparatus comprising
one or more functional units coupled by a bus, wherein the one or more functional units include functional unit inputs;
at least one input register coupled between the bus and at least one functional unit input, the at least one register configured to store a value received from the bus at a beginning or end of a first clock cycle; and
a data path from the at least one input register to a given stage in the execution pipeline so that the value provided by the register is available for use at a time of execution of the given stage of the at least one functional unit, wherein the value is available to the given stage at a next clock cycle from the first clock cycle.

13. The apparatus of claim 12, wherein the register includes circuitry for selectively providing a constant value.

14. The apparatus of claim 12, wherein the register includes circuitry for selectively providing a constant value.

15. The apparatus of claim 12, wherein the data value is obtained from the at least one register without performing an access command to memory.

16. A method for providing a data value in a computational unit in an adaptable computing engine, wherein the computational unit includes a multi-stage pipeline, the method comprising
coupling one or more functional units to a bus, wherein the one or more functional units include functional unit inputs;
coupling at least one register between the bus and at least one functional unit input;
storing a value received from the bus in the at least one register at a beginning or end of a first clock cycle; and
providing a data path from the at least one register to a given stage in the execution pipeline so that the value provided by the at least one register is available for use at a time of execution of the given stage of the at least one functional unit, wherein the value is available to the given stage at a next clock cycle from the first clock cycle.

17. The method of claim 16, wherein the data value is obtained from the at least one register without performing an access command to memory.

* * * * *